US008281337B2

(12) United States Patent
Van Vleck et al.

(10) Patent No.: US 8,281,337 B2
(45) Date of Patent: Oct. 2, 2012

(54) SYSTEM AND METHOD TO DISPLAY MEDIA CONTENT AND AN INTERACTIVE DISPLAY

(75) Inventors: Paul Van Vleck, Austin, TX (US);
Javier Arellano, Austin, TX (US);
Donald Garofalo, Austin, TX (US);
Marc Sullivan, Austin, TX (US);
Gregory Edwards, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 676 days.

(21) Appl. No.: 11/957,087

(22) Filed: Dec. 14, 2007

(65) Prior Publication Data

US 2009/0158369 A1 Jun. 18, 2009

(51) Int. Cl.
*G06F 3/00* (2006.01)
*G06F 13/00* (2006.01)
*H04N 5/445* (2011.01)
*H04N 7/173* (2011.01)

(52) U.S. Cl. ............. 725/37; 725/38; 725/110; 725/131

(58) Field of Classification Search ............. 725/24, 725/37, 58, 105, 109, 32, 38, 100, 110, 131, 725/134, 151, 153
See application file for complete search history.

(56) References Cited

U.S. PATENT DOCUMENTS

| 5,602,598 | A * | 2/1997 | Shintani .................. 348/565 |
|---|---|---|---|
| 6,308,327 | B1 | 10/2001 | Liu et al. |
| 6,741,684 | B2 | 5/2004 | Kaars |
| 6,766,524 | B1 * | 7/2004 | Matheny et al. ................. 725/23 |
| 7,305,695 | B1 * | 12/2007 | Ramakesavan ................. 725/88 |
| 8,132,210 | B2 | 3/2012 | Ackley et al. |
| 2002/0174430 | A1 * | 11/2002 | Ellis et al. ................. 725/46 |
| 2004/0030599 | A1 * | 2/2004 | Sie et al. ................. 705/14 |
| 2004/0107439 | A1 * | 6/2004 | Hassell et al. ................. 725/44 |
| 2006/0190966 | A1 | 8/2006 | McKissick et al. |
| 2007/0039020 | A1 | 2/2007 | Cansler, Jr. et al. |
| 2009/0007216 | A1 | 1/2009 | Ku et al. |

OTHER PUBLICATIONS

Bernard Ku, et al., System and Method of Delivering Video Content, U.S. Appl. No. 11/823,276, filed Jun. 26, 2007, (34 pgs).

* cited by examiner

*Primary Examiner* — John Schnurr

(74) *Attorney, Agent, or Firm* — Toler Law Group, PC

(57) ABSTRACT

A method of displaying an interactive display at a set top box (STB) device is disclosed. The method includes receiving a media content stream. The media content stream includes a first content segment and a second content segment, where the second content segment is received at the STB device after the first content segment. The method also includes displaying a first interactive display, where the first interactive display includes at least one field to receive user input. The method also includes displaying a second interactive display after displaying the first interactive display but before displaying the second content segment. The method also includes performing a user-designated transition with respect to the second content segment based on a user input received via the second interactive display.

23 Claims, 6 Drawing Sheets

SYSTEM AND METHOD TO DISPLAY MEDIA CONTENT AND AN INTERACTIVE DISPLAY

FIELD OF THE DISCLOSURE

The present disclosure is generally related to displaying media content and an interactive display.

BACKGROUND

Modern communication networks may be used to deliver media content, such as movies, television shows, or video-on-demand programs, to subscribers. A service provider may also provide the subscriber with an interactive display. One problem with presenting an interactive display relates to determining when to display the interactive display. For example, when the interactive display is displayed, the interactive display should not interrupt the media content being delivered to the subscriber or prevent the subscriber from viewing an entire media content segment. Further, when the subscriber is interacting with the interactive display, the interaction should not prevent the subscriber from viewing subsequent media content. Thus, there is a need for an improved system and method for displaying media content and an interactive display.

DETAILED DESCRIPTION OF THE DRAWINGS

Figure 1:
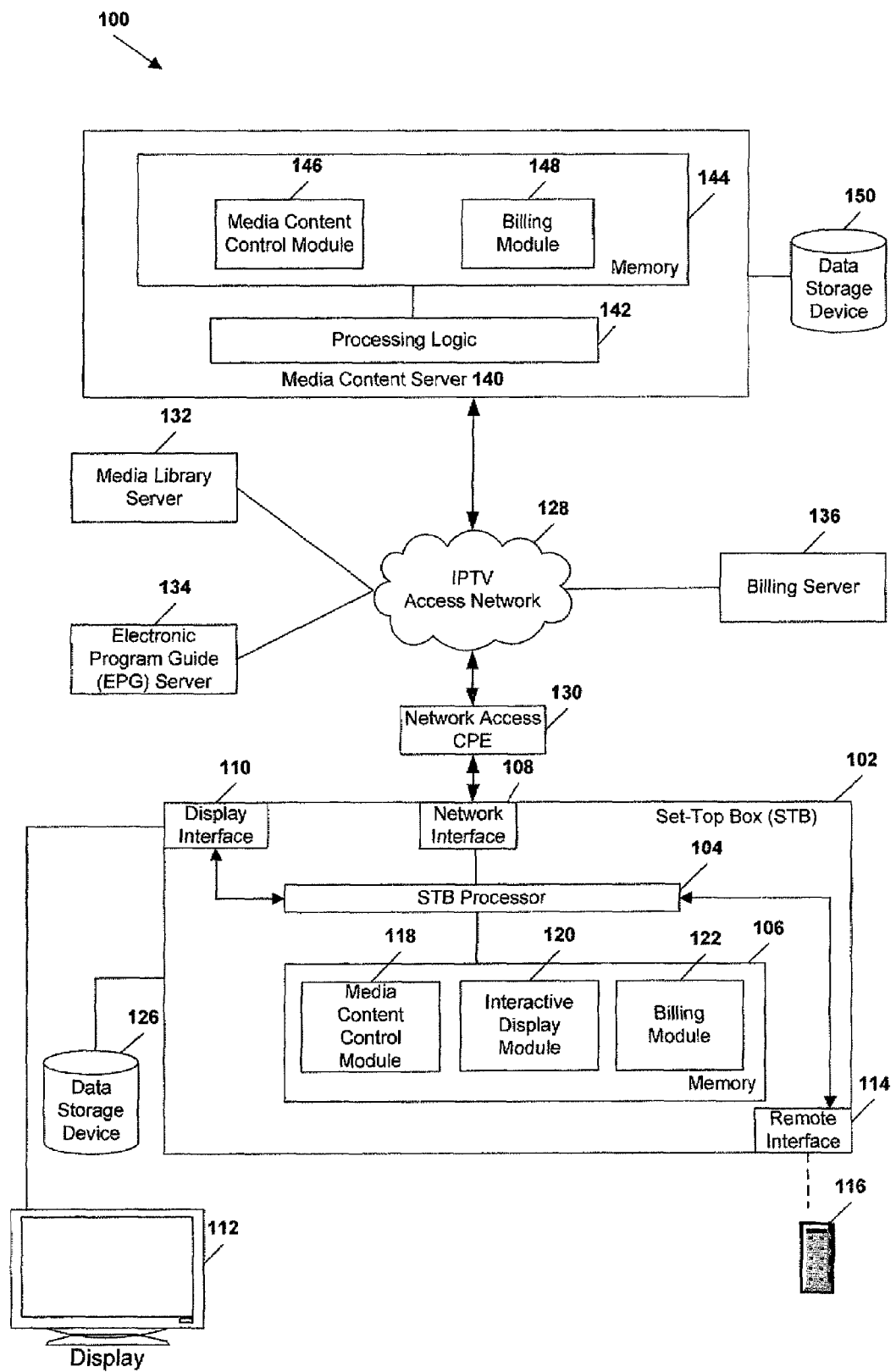
FIG. 1 is a block diagram of an embodiment of a system to display media content and an interactive display.

In a particular embodiment a method of displaying an interactive display at a set top box (STB) device is disclosed. The method includes receiving a media content stream, the media content stream including a first content segment and a second content segment, the second content segment received at the STB device after the first content segment. The method also includes displaying a first interactive display, the first interactive display including at least one field to receive user input. The method also includes displaying a second interactive display after displaying the first interactive display but before displaying the second content segment. The method also includes performing a user-designated transition with respect to the second content segment based on a user input via the second interactive display.

In another embodiment, a method of distributing media content at a media content server is disclosed. The method includes sending media content to at least one set top box (STB) device, the media content including a first content segment and a second content segment, the second content segment to be sent after the first content segment. The method also includes sending a marker to the at least one STB before sending the second content segment, the marker to instruct the at least one STB to display a first interactive display. The method also includes instructing the at least one STB to display a second interactive display in response to determining that the second content segment is scheduled to be sent to the at least one STB. The method also includes receiving data associated with user input received via use of the second interactive display at the at least one STB, the received data identifying a user-designated transition with respect to the first interactive display and the second content segment.

In another embodiment, a system to process a media content stream is disclosed. The system includes a media content control module to receive a media content stream. The media content stream includes a first content segment and a second content segment. The second content segment is received after the first content segment. The system also includes an interactive display module. The interactive display module displays a first interactive display, where the first interactive display includes at least one field to receive user input. The interactive display module also displays a second interactive display after displaying the first interactive display but before displaying the second content segment. The interactive display module also performs a user-designated transition with respect to the second content segment based on a user input received via the second interactive display.

In another embodiment a computer program product is disclosed. The computer program product includes a computer-readable storage medium. The computer-readable storage medium includes operational instructions executable by a processor for displaying an interactive display at a set top box (STB) device. The computer program product includes operational instructions for receiving a media content stream, the media content stream including a first content segment and a second content segment, the second content segment received at the STB device after the first content segment. The computer program product also includes operational instructions for displaying a first interactive display, the first interactive display including at least one field to receive user input. The computer program product also includes operational instructions for displaying a second interactive display after displaying the first interactive display but before displaying the second content segment. The computer program product also includes operational instructions for performing a user-designated transition with respect to the second content segment based on a user input received via the second interactive display.

In another embodiment, a system to distribute media content is disclosed. The system includes a media content control module to send media content to at least one set top box (STB) device. The media content includes a first content segment and a second content segment, the second content segment to be sent after the first content segment. The media content control module also sends a marker to the at least one STB device before sending the second content segment to the at least one STB device. The marker causes the at least one STB device to display an interactive display. The media content control module receives user input data identifying a user-designated transition with respect to displaying the first interactive display and the second content segment.

FIG. 1 is a block diagram illustrating an embodiment of a system 100 to display media content and an interactive display. In a particular embodiment, the system 100 includes a set-top box (STB) device 102 coupled to a private Internet Protocol Television (IPTV) access network 128 via network access customer premises equipment (CPE) 130. A media library server 132, an electronic program guide (EPG) server 134, a billing server 136, and a media content server 140 are also coupled to the IPTV access network 128. A data storage device 150 is coupled to the media content server 140.

In a particular embodiment, the STB device 102 is configured to display media content received from the media content server 140 via the IPTV access network 128. The STB device 102 includes an STB processor 104 and a memory 106 accessible to the STB processor 104. The STB device 102 communicates with the IPTV access network 128 via a network interface 108. The STB processor 104 communicates media content to a display device 112 via a display interface 110. In addition, the STB processor 104 communicates with a remote control 116 via a remote interface 114. A media content stream may be selected from an input device associated with the STB device 102, such as the remote control 116. For example, a media content stream may include one or more media content segments, such as a first content segment and a second content segment. For example, the first and second content segment may each be a television show, a movie, or a video-on-demand program.

The memory 106 includes a media content control module 118, an interactive display module 120, and a billing module 122. In a particular embodiment, the billing module 122 may include instructions executable by the STB processor 104 to record billing information relating to viewing a media content stream, such as a television show or movie. In a particular embodiment, the media control module 118 may include instructions executable by the STB processor 104 to receive media content from the media content server 140. In a particular embodiment, the media content control module 118 may also include instructions executable by the STB processor 104 to provide media content to the display device 112 via the display interface 110.

The STB device 102 may also communicate with a data storage device, such as the data storage device 126. For example, the data storage device 126 may be coupled to the set-top box device 102. In another example, the data storage device 126 may be integrated with the STB device 102. The data storage device 126 may include a digital video recorder (DVR). In a particular embodiment, the STB device 102 may be configured to instruct the data storage device 126 to record one or more media content segments.

In a particular embodiment, the set-top box device 102 may be configured to request and receive media content, such as a television show, movie, or video-on-demand program, from the media content server 140. The network access CPE 130 may facilitate communication between the network interface 108 and the IPTV access network 128. The network access CPE 130 may include a router, a local area network device, a modem, such as a digital subscriber line (DSL) modem, a residential gateway, any other suitable device for facilitating communication between the network interface 108 of the set-top box device 102 and the private IPTV access network 128, or any combination thereof.

In a particular embodiment, the media content control module 118 may also include instructions executable by the STB processor 104 to analyze a portion of the media content stream and determine a characteristic of the media content stream. For example, the STB processor 104 may analyze a portion of the media content stream to determine a characteristic of the media content stream, such as a marker, an opening credits, or a closing credits of a movie, television show, or video-on-demand program. The STB device 102 may display a first interactive display after identifying the determined characteristic of the media content stream. For example, the first interactive display may allow a user to purchase media content, such as the first media content segment.

The interactive display module 120 may also include instructions executable by the STB processor 104 to display multiple interactive displays. In one illustrative embodiment the interactive display module 120 may be executable by the STB processor 104 to display a first interactive display and to receive user input related to media content. The interactive display may allow a subscriber associated with the STB device 102 to submit a recommendation, submit comments, purchase recently or currently viewed media content or related merchandise, or view related media content. For example, the interactive display module 120 may be executable by the STB processor 104 to display a first interactive display that enables the subscriber to recommend the recently viewed media content to a friend or relative. Additionally, the interactive display module 120 may be executable by the STB processor 104 to display a first interactive display that enables the subscriber to submit comments about the recently viewed media content for others to view.

Figure 4:
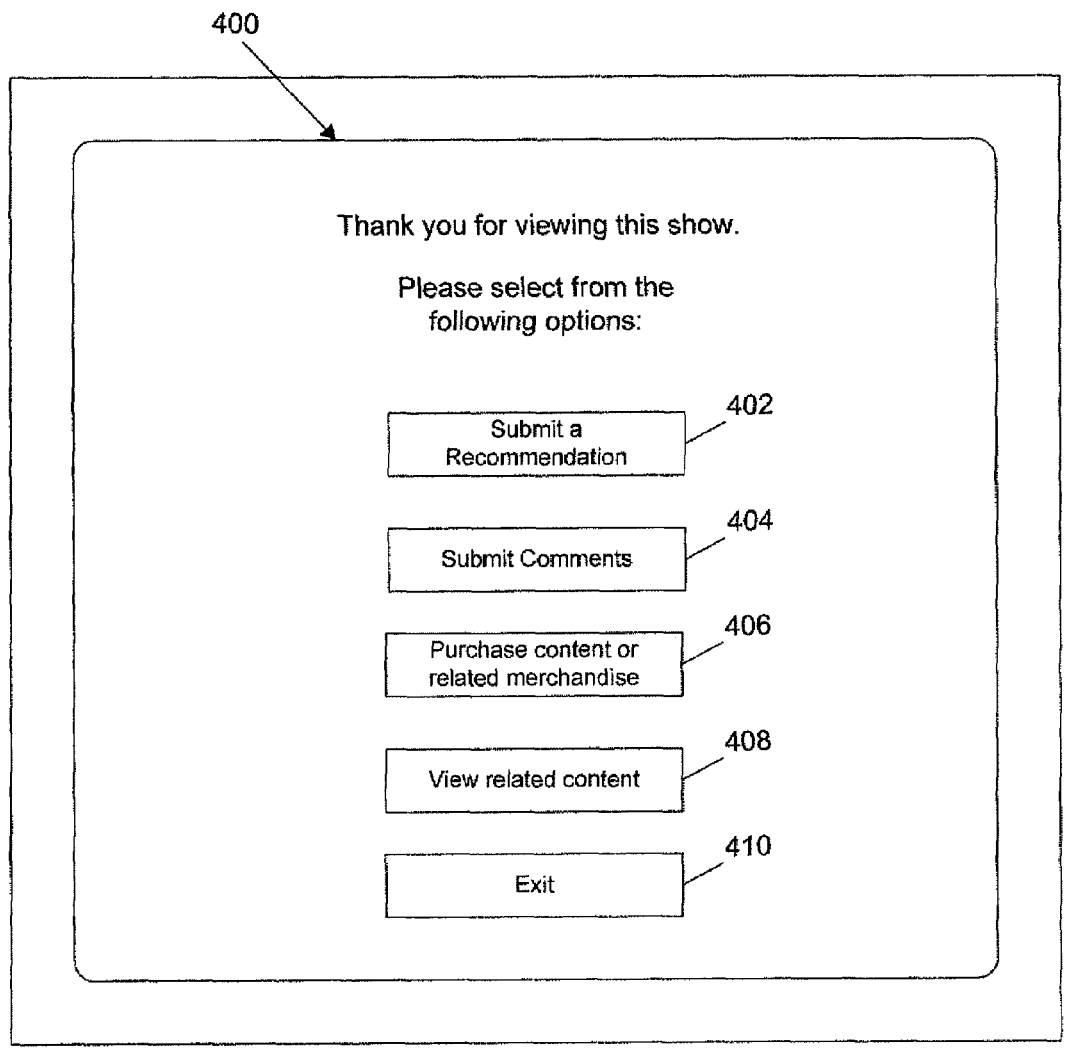
FIG. 4 is a diagram of a particular embodiment of a graphical user interface to display an interactive display.

The interactive display module 120 may be executable by the STB processor 104 to display a first interactive display that enables the subscriber to purchase the recently viewed media content or merchandise related to the recently viewed media content, such as books, or clothing. The purchased media content may be recorded onto a physical media and sent to the subscriber, or the STB device 102 may be adapted to download the purchased media content. Similarly, the interactive display module 120 may be executable by the STB processor 104 to display a first interactive display that enables the subscriber to select related media content to view, such as movies directed by the same director, or television shows starring the same actors as in recently or currently viewed content. Thus, when the subscriber is viewing a first media content segment, a second media content segment may be scheduled for delivery to the STB device 102, and the subscriber may also use the first interactive module to schedule delivery of a third media content segment related to the first media content segment. An example of an interactive display Graphical User Interface (GUI) is illustrated in FIG. 4.

In a particular embodiment, the interactive display module 120 may be executable by the STB processor 104 to determine a time to display an interactive display. The time determined by the interactive display module 120 to display the first interactive display may be associated with a time to display opening credits or closing credits. For example, the first interactive display may be displayed at the start of the closing credits of a television show or movie included in the media content stream, so that the first interactive display does not interfere with viewing the media content stream. The interactive display module 120 may be executable by the STB processor 104 to display a first interactive display on display device 112 along with or instead of the media content stream. In one illustrative embodiment, the interactive display module 120 may be executable by the STB processor 104 to display the first interactive display as a pop-up window that overlays the media content stream, to enable user interaction with the interactive display while the media content stream is viewed.

In another illustrative embodiment, the interactive display module 120 may be executable by the STB processor 104 to display both the first interactive display and the media content stream, each in a distinct portion of the display device 112. For example, the interactive display module 120 may be executable by the STB processor 104 to display two windows on the display device 112, with a first window displaying the first interactive display and a second window displaying the media content stream. The two windows may be the same size or different sizes.

In another illustrative embodiment, the interactive display module 120 may be executable by the STB processor 104 to selectively pause the media content stream while displaying the first interactive display. For example, the interactive display module 120 may be executable by the STB processor 104 to instruct the media content server 140 to pause the media content stream until the interactive display module 120 determines that the subscriber has completed interacting with the first interactive display.

In another illustrative embodiment, the interactive display module 120 may be executable by the STB processor 104 to display the first interactive display while playing an audio portion, but not a video portion, of the media content stream. For example, the interactive display module 120 may be executable by the STB processor 104 to instruct the display device 112 to display a video portion of the first interactive display and an audio portion of the media content.

In another illustrative embodiment, the interactive display module 120 may be executable by the STB processor 104 to display a second interactive display including user-selectable options associated with a user-designated transition. A first interactive page may be displayed at or near the end of a first content segment. The second interactive display may be displayed in response to determining that a second content segment is scheduled for delivery while the first interactive display is being displayed. The user-designated transition may enable the subscriber to choose how to transition from the first interactive display to the second content segment. The subscriber may choose an option using the remote control 116, and the STB device 102 may receive the subscriber's selection via the remote interface 114.

Figure 5:
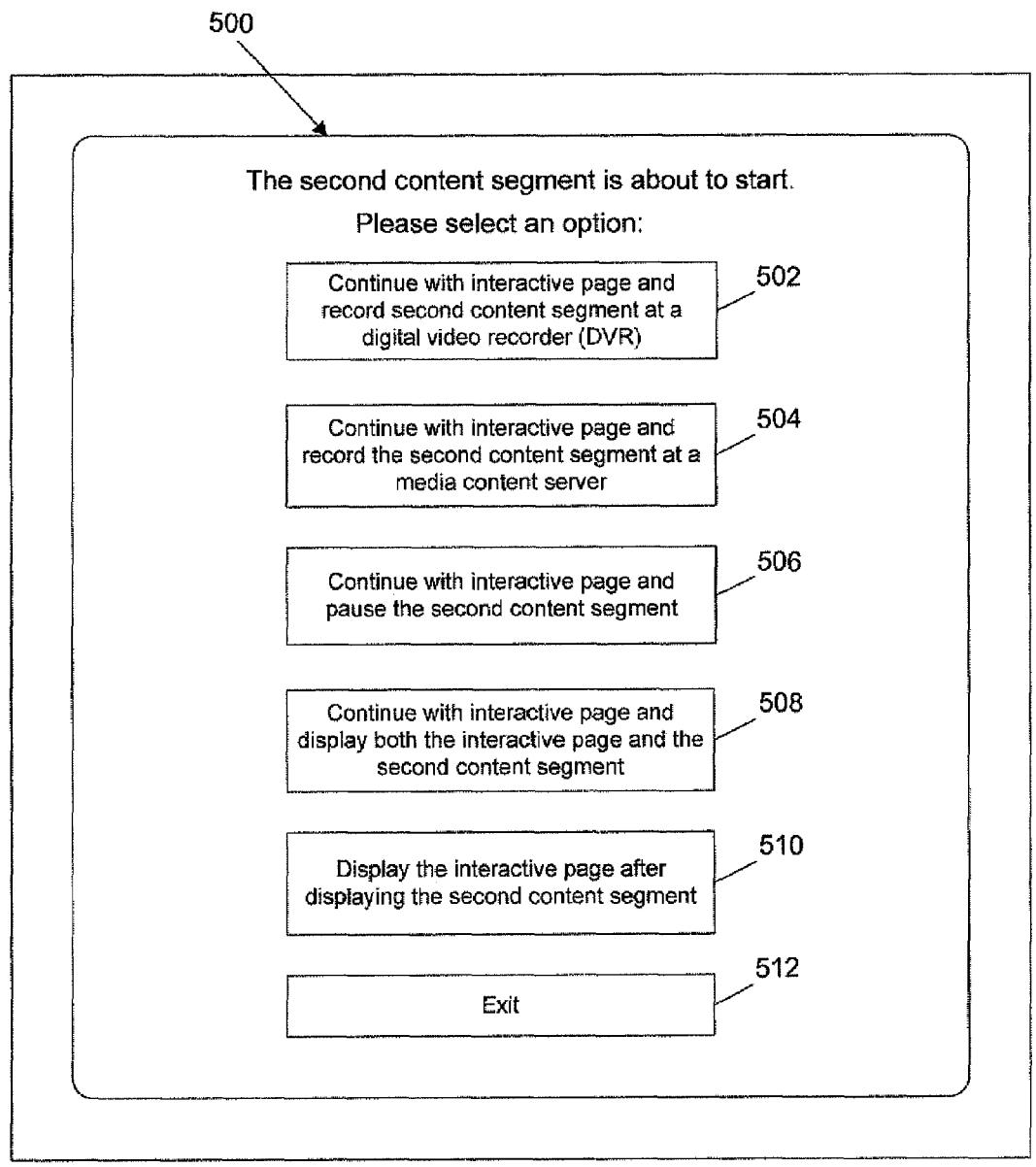
FIG. 5 is a diagram of a second particular embodiment of a graphical user interface to display an interactive display.

In one example of a user-designated transition, the interactive display module 120 may be executable by the STB processor 104 to display the second interactive display and the media content control module 118 may be executable by the STB processor 104 to send a request to the media content server 140 to record the second content segment at a data storage device, such as data storage device 126 or data storage device 150. In another example of a user-designated transition, the interactive display module 120 may be executable by the STB processor 104 to instruct the media content server 140 to pause the second content stream. For example, the second content stream may be paused until the interactive display module 120 receives an indication that the subscriber has finished interacting with the first interactive display. In another example of a user-designated transition, the interactive display module 120 may be executable by the STB processor 104 to selectively display the first content segment and the second content segment. For example, the first content segment and the second content segment may both be displayed on the display device 112 by displaying each media content segment in separate, adjacent windows. In a fourth example of a user-designated transition, the interactive display module 120 may be executable by the STB processor 104 to display the first interactive display after displaying the second content segment. An example of a second particular embodiment of a graphical user interface to display an interactive display with user-selectable transition options is shown in FIG. 5.

The user-designated transition associated with the second interactive display may be determined based on one or more of a user selection, a user profile, and a default transition. For example, the user may be asked to select a user-designated transition. Additionally, a user profile may be programmed to specify a user-designated transition. For example, the media control module 118 may be executable by the STB processor 104 to ask the user to specify a user-designated transition the first time the STB device 102 is powered on and then use the specified user-designated transition for subsequent transitions. Additionally, a user-designated transition may be specified by the manufacturer of the STB device 102 or a service provider as a default user-designated transition, which can be altered by the user.

In a particular embodiment, the media content server 140 includes a processing logic 142, a memory 144, and a data storage device 150. The memory 144 includes a media content control module 146 and a billing module 148. The media content control module 146 may include instructions executable by the processing logic 142 to receive one or more media content stream requests from the STB device 102. The media content control module 146 may also include instructions executable by the processing logic 142 to send one or more media content streams to the STB device 102. For example, a media content stream may include one or more media content segments, such as a first content segment and a second content segment. For example, the first and second content segment may each be a television show, a movie, or a video-on-demand program.

In a particular embodiment, the media content control module 146 may also include instructions executable by the processing logic 142 to send a marker in the media content stream. For example, the marker may be sent with the first content segment, before the second content segment, or with the second content segment. The marker may be detectable by the STB device 102 and may cause the STB device 102 to display a first interactive display after identifying the marker in the media content stream. For example, the marker may cause the STB device 102 to display a first interactive display, which enables a user to purchase a content segment, such as the first media content segment.

In a particular embodiment, the media content control module 146 may be executable by the processing logic 142 to send instructions to the STB device 102 to display a second interactive display when the media content control module 146 determines that the second content segment is scheduled to be sent to the STB device 102. The media content control module 146 may be executable by the processing logic 142 to receive from the STB device 102 a user input via the second interactive display, where the user input identifies a user-designated transition with respect to the first interactive display and the second interactive display. For example, if a subscriber is using the first interactive display to purchase a first content segment, and the media content control module 146 determines that a second content segment is scheduled to be delivered to the subscriber, then the media content control module 146 may send instructions to the STB device 102 to display the second interactive display. The second interactive display may include user-selectable options. For example, the second interactive display may enable the subscriber to select an option to record the second content segment at a DVR or an option to delay delivery of the second content segment until the subscriber has completed interacting with the first interactive display.

In a particular embodiment, the billing module 148 may include instructions executable by the processing logic 142 to receive billing data from the STB device 102. The data storage device 150 may include a digital video recorder (DVR) for recording, storing, and sending one or more media content segments to the STB device 102.

The set-top box device 102 and the media content server 140 may communicate with the media library server 132, the electronic program guide (EP) server 134, the billing server 136, or any combination thereof, via the IPTV access network 128. The media library server 132 may store the media content, such as television shows, movies, and video-on-demand programs, which is distributed by the media content server 140. The EPG server 134 may provide information about the media content scheduled for delivery to the STB device 102, such as a start time of the media content an end time of the media content, the type of the media content, and a rating describing the intended audience of the media content. The billing server 136 may periodically receive billing information from the billing module 122 and use the billing information to generate a bill for the subscriber.

For ease of explanation, the various modules 118-122 and 146-148 have been described in terms of processor-executable instructions. However, those skilled in the art will appreciate that such modules can be implemented as hardware logic, processor-executable instructions, or any combination thereof. In addition, although a single STB device 102 is illustrated, the system 100 may include any number of STB devices. As used herein, an STB device may be any device capable of receiving media content via an IPTV access network, such as a personal digital assistant (PDA), a cell phone, a portable media device, or any other device configured to receive the media content and send the content to a display.

Figure 2:
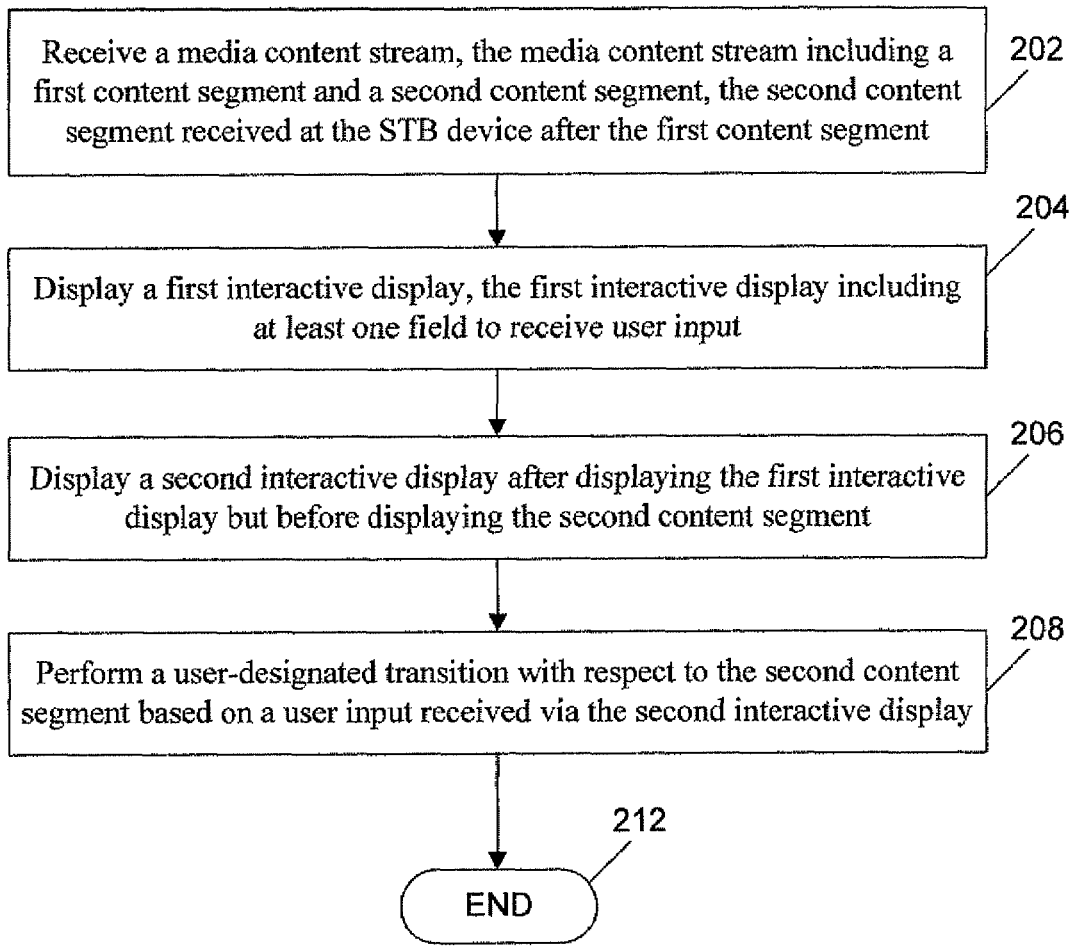
FIG. 2 is a flow diagram of a particular embodiment of a method of using an interactive display.

FIG. 2 is a flow diagram of a particular embodiment of a method of displaying media content and using an interactive display. The method may be executed by a module, such as the media content control module 118 in FIG. 1. At 202, a first interactive display may be displayed, the first interactive display including at least one field to receive user input. For example, the STB device 102 may receive a media content stream from the media content server 140. The media content stream may include a first content segment and a second content segment that is to be displayed after display of the first content segment. For example, the first content segment may be a first episode of a television show, while the second content segment may be a second episode of a television show or a movie.

At 204, a first interactive display may be displayed, the first interactive display including at least one field to receive user input. An example of a first interactive display is shown in FIG. 4. The first interactive display may provide user-designated options for performing an action related to the media content stream, such as purchasing the media content stream or purchasing merchandise related to the media content stream. The interactive display and the media content stream may both be displayed so that a subscriber can interact with the interactive display while viewing the media content stream. At 206, a second interactive display may be displayed after displaying the first interactive display but before displaying the second content segment. For example, the second interactive display may provide a user-designated transition to allow the user to pause or record the second content segment. FIG. 5 is an example of an interactive display, which allows a user to select a user-designated transition.

At 208, a user-designated transition may be performed with respect to the second content segment based on a user input received via the second interactive display. The user-designated transition may be selected from several options. For example, the user-designated transition may include the interactive display module 120 displaying the interactive display and the media content control module 118 sending a request to the media content server 140 to record the second content segment at a data storage device, such as the data storage device 126 or the data storage device 150. In another example of a user-designated transition, the interactive display module 120 may be executable by the STB processor 104 to send a request to the media content server 140 to pause the second content stream. For example, the second content stream may be paused until the interactive display module 120 receives an indication that the subscriber has finished using the interactive display. In a third example of a user-designated transition, the interactive display module 120 may be executable by the STB processor 104 to selectively display the first content segment and the second content segment. For example, the first content segment and the second content segment may both be displayed on the display device 112 by displaying each content segment in separate, adjacent windows. In a fourth example of a user-designated transition, the interactive display module 120 may be executable by the STB processor 104 to display the interactive display after displaying the second content segment. The method terminates at 212.

Figure 3:
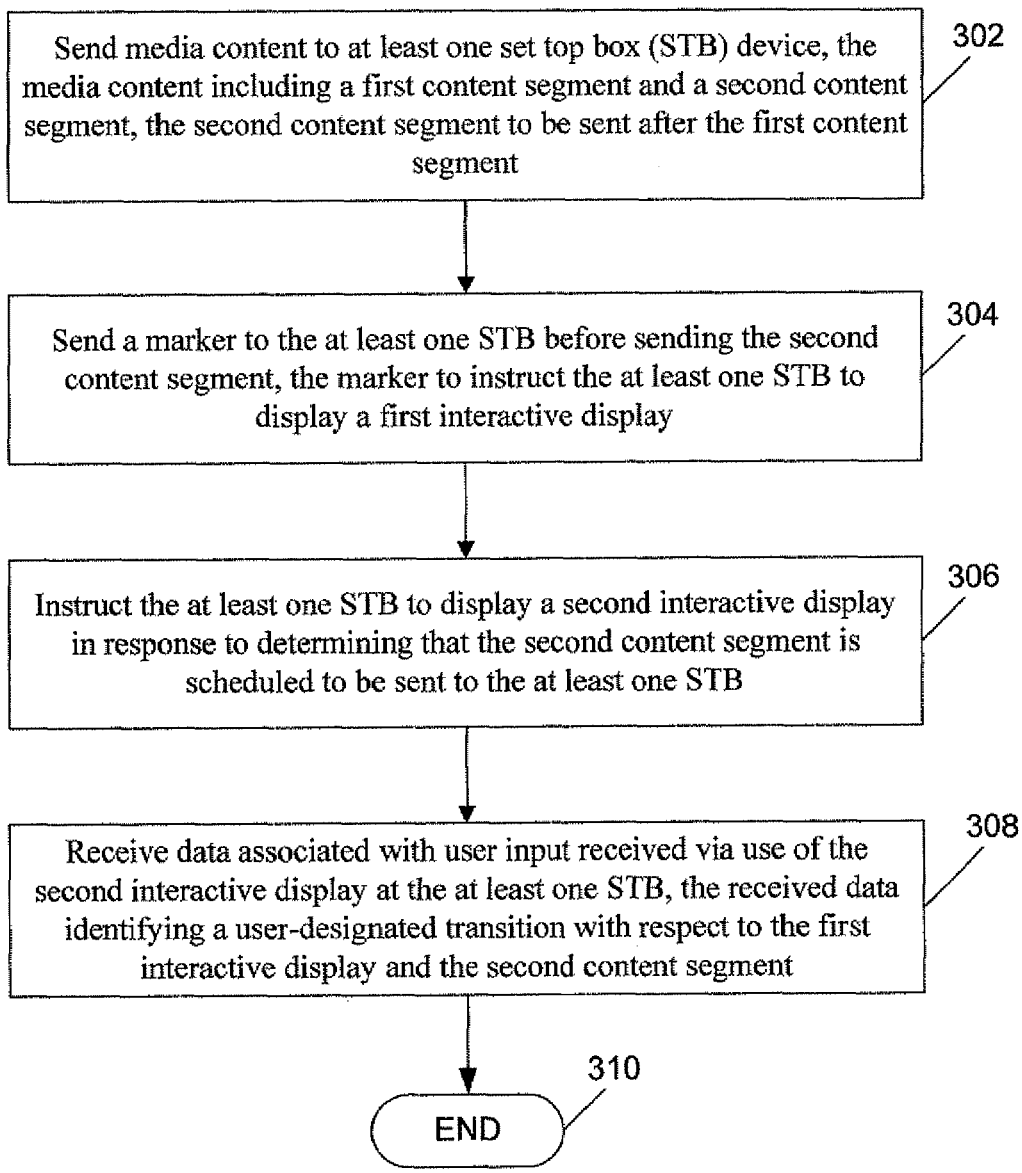
FIG. 3 is a flow diagram of a second particular embodiment of a method of using an interactive display.

FIG. 3 is a flow diagram of a particular embodiment of a method of displaying media content and an interactive display. The method may be executed by a module, such as the media content control module 146 in FIG. 1. At 302, media content is sent to at least one set top box (STB) device, the media content including a first content segment and a second content segment, the second content segment to be sent after the first content segment. For example, the media content may be sent by a media content server, such as the media content server 140 in FIG. 1. The at least one STB device may be an STB device, such as the STB device 102 in FIG. 1. At 304, a marker may be sent to the at least one STB before sending the second content segment, the marker to instruct the at least one STB to display a first interactive display. For example, the marker may be sent by a media content server, such as the media content server 140, to an STB device, such as the STB device 102. At 306, the at least one STB device may be instructed to display a second interactive display in response to determining that the second content segment is scheduled to be sent to the at least one STB. The method terminates at 310.

FIG. 4 is a diagram of a particular embodiment of a graphical user interface (GUI) 400 which may provide an interactive display. The graphical user interface 400 may be provided by a display device coupled to a set-top box device, such as the STB device 102 in FIG. 1. The graphical user interface 400 provides a subscriber with options for performing an action related to the media content currently being viewed. A first selectable option 402 enables the subscriber to submit a recommendation related to the content being viewed. A second selectable option 404 enables the subscriber to submit comments related to the content being viewed. A third selectable option 406 enables the subscriber to purchase content or merchandise related to the content being viewed. For example, the subscriber may purchase a t-shirt, a poster, or an audio soundtrack related to the content being viewed. A fourth selectable option 408 enables the subscriber to view content related to the content being viewed. A fifth selectable option 402 enables the subscriber to exit the interactive display graphical user interface.

FIG. 5 is a diagram of a second particular embodiment of a graphical user interface (GUI) 500 which may provide an interactive display. The graphical user interface 500 may be presented on a display, such as the display device 112, via a set-top box device, such as the STB device 102 in FIG. 1. In a particular embodiment, the GUI 500 may be displayed when a second content segment is scheduled for display while a first interactive display, such as the GUI 400 in FIG. 4, is displayed. For example, a subscriber may interact with a first interactive display, such as the interactive display shown in FIG. 4, which allows the subscriber to submit a recommendation or comment, purchase content or related merchandise, or view related content. If a second content segment is scheduled for display, the graphical user interface 500 may presented to the subscriber. The second interactive display may provide the subscriber with user-selectable options 502-512 for selecting a user-designated transition between the first interactive display and the second content segment. A first selectable option 502 enables the subscriber to continue interacting with the interactive display and record a second content segment at the digital video recorder (DVR). The DVR may be a digital storage device, such as data storage device 126. A second selectable option 504 enables the subscriber to continue interacting with the interactive display and record the second content segment at a media content server, such as media content server 140 in FIG. 1. A third selectable option 506 enables the subscriber to continue interacting with the interactive display and pause the second content segment. A fourth selectable option 508 enables the subscriber to view the interactive display and the second content segment. A fifth selectable option 510 enables the subscriber to display the interactive display after displaying the second content segment. A sixth selectable option 512 enables the subscriber to exit the interactive display graphical user interface.

Figure 6:
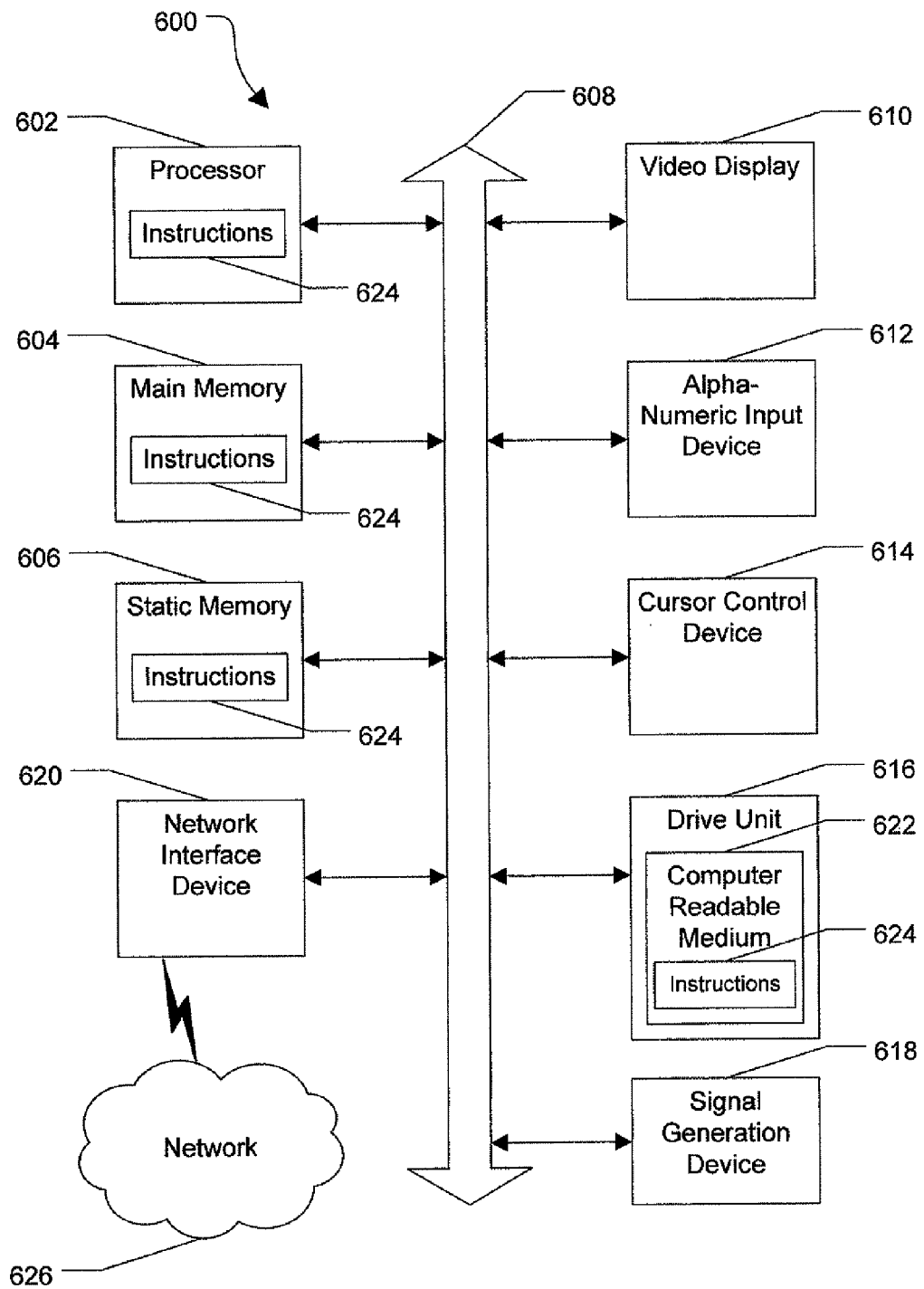
FIG. 6 is a block diagram of an illustrative embodiment of a general computer system.

Referring to FIG. 6, an illustrative embodiment of a general computer system is shown and is designated 600. The computer system 600 can include a set of instructions that can be executed to cause the computer system 600 to perform any one or more of the methods or computer based functions disclosed herein. The computer system 600, or any portion thereof may operate as a standalone device or may be connected, e.g., using a network, to other computer systems or peripheral devices, including a media library server, an electronic program guide (EPG) server, a billing server, a media content server, or a set-top box device, as shown in FIG. 1.

In a networked deployment, the computer system may operate in the capacity of an IPTV server, such as a video server or application server, or a set-top box device. The computer system 600 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 600 can be implemented using electronic devices that provide voice, video or data communication. Further, while a single computer system 600 is illustrated, the term "system" shall also be taken to include any collection of systems or sub-systems that individually or jointly execute a set, or multiple sets, of instructions to perform one or more computer functions.

As illustrated in FIG. 6, the computer system 600 may include a processor 602, e.g., a central processing unit (CPU), a graphics-processing unit (GPU), or both. Moreover, the computer system 600 can include a main memory 604 and a static memory 606 that can communicate with each other via a bus 608. As shown, the computer system 600 may further include a video display unit 610, such as a liquid crystal display (LCD), an organic light emitting diode (OLED), a flat panel display, a solid-state display, or a cathode ray tube (CRT). Additionally, the computer system 600 may include an input device 612, such as a keyboard, and a cursor control device 614, such as a mouse. The computer system 600 can also include a disk drive unit 616, a signal generation device 618, such as a speaker or remote control, and a network interface device 620.

In a particular embodiment, as depicted in FIG. 6, the disk drive unit 616 may include a computer-readable medium 622 in which one or more sets of instructions 624, e.g. software, can be embedded. Further, the instructions 624 may embody one or more of the methods or logic as described herein. In a particular embodiment, the instructions 624 may reside completely, or at least partially, within the main memory 604, the static memory 606, and/or within the processor 602 during execution by the computer system 600. The main memory 604 and the processor 602 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 624 or receives and executes instructions 624 responsive to a propagated signal, so that a device connected to a network 626 can communicate voice, video or data over the network 626. Further, the instructions 624 may be transmitted or received over the network 626 via the network interface device 620.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing or encoding a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device. Accordingly, the disclosure is considered to include any one or more of a computer-readable medium and other equivalents and successor media, in which data or instructions may be stored.

In accordance with various embodiments, the methods described herein may be implemented as one or more software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that software that implements the disclosed methods may optionally be stored on a tangible storage medium, such as: a magnetic medium, such as a disk or tape; a magneto-optical or optical medium, such as a disk; or a solid state medium, such as a memory card or other package that houses one or more read-only (non-volatile) memories, random access memories, or other re-writable (volatile) memories. The software may also utilize a signal including computer instructions. A digital file attachment to e-mail or other self-contained information archive or set of archives is considered a distribution medium equivalent to a tangible storage medium. Accordingly, the disclosure is considered to include a tangible storage medium or distribution medium as listed herein, and other equivalents and successor media, in which the software implementations herein may be stored.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.52(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method comprising:
    receiving a media content stream at a set top box device, the media content stream including a first content segment and a second content segment, the second content segment received at the set top box device after the first content segment;
    displaying a first interactive display, the first interactive display including a plurality of selectable options for performing an action related to the first content segment, wherein the plurality of selectable options includes at least a first selectable option to make a purchase related to the first content segment;
    displaying a second interactive display before displaying the second content segment when a subscriber is interacting with the first interactive display; and
    performing a user-designated transition with respect to the second content segment based on a user input received via the second interactive display.

2. The method of claim 1, further comprising displaying the first interactive display in response to determining a time to display the first interactive display.

3. The method of claim 2, wherein determining the time to display the first interactive display comprises identifying a marker in the media content stream, the marker identifying a closing credits segment of the first content segment or an opening credits segment of the second content segment.

4. The method of claim 2, wherein determining the time to display the first interactive display comprises identifying a characteristic of a portion of the first content segment.

5. The method of claim 4, wherein the characteristic of the portion of the first content segment is one of an opening credits characteristic and a closing credits characteristic.

6. The method of claim 1, wherein performing the user-designated transition comprises displaying the first interactive display in a first window while concurrently displaying the second interactive display in a second window.

7. The method of claim 1, wherein performing the user-designated transition comprises displaying the first interactive display while playing an audio portion, but not a video portion, of the second content segment.

8. The method of claim 1, wherein performing the user-designated transition comprises sending a request to a media content server while displaying the first interactive display, the request causing the media content server to pause transmission of the media content stream.

9. The method of claim 1, wherein performing the user-designated transition comprises displaying the first interactive display while recording the second content segment at a digital video recorder.

10. A method of distributing media content at a media content server, the method comprising:
sending media content to at least one set top box device, the media content including a first content segment and a second content segment, the second content segment to be sent after the first content segment;
sending a marker to the at least one set top box device before sending the second content segment, the marker to instruct the at least one set top box device to display a first interactive display, wherein the first interactive display includes a plurality of selectable options for performing an action related to the first content segment, wherein the plurality of selectable options includes at least a first selectable option to make a purchase related to the first content segment;
instructing the at least one set top box device to display a second interactive display indicating that the second content segment is scheduled to be sent to the at least one set top box device when a subscriber is interacting with the first interactive display; and
receiving data associated with user input received via the second interactive display at the at least one set top box device, the received data identifying a user-designated transition with respect to the first interactive display and the second content segment.

11. The method of claim 10, further comprising receiving electronic program guide data, the electronic program guide data indicating a start time of the first content segment, an end time of the first content segment, and a time of the closing credits, wherein the marker is sent based on the time of the closing credits.

12. The method of claim 10, wherein sending the marker comprises:
identifying a portion of the first content segment; and
inserting the marker at the identified portion of the first content segment based on an identified characteristic, the identified characteristic including one of an opening credits segment and a closing credits segment.

13. The method of claim 10, wherein the user-designated transition indicates that delivery of the second content segment to the at least one set top box device is to be delayed.

14. The method of claim 10, further comprising:
determining the user-designated transition based on at least one of a user selection, a user profile, and a default transition; and
performing the user-designated transition.

15. A system to process a media content stream, the system comprising:
a processor;
a media content control module executable by the processor to:
receive a media content stream, the media content stream including a first content segment and a second content segment, the second content segment received after the first content segment; and
an interactive display module executable by the processor to:
display a first interactive display, the first interactive display including a plurality of selectable options for performing an action related to the first content segment, wherein the plurality of selectable options includes at least a first selectable option to make a purchase related to the first content segment;
display a second interactive display before displaying the second content segment when a subscriber is interacting with the first interactive display; and
perform a user-designated transition with respect to the first interactive display and the second content segment based on a user input received via the second interactive display.

16. The system of claim 15, wherein the interactive display module is further adapted to display the first interactive display in response to determining a time to display the first interactive display.

17. The system of claim 15, wherein the user-designated transition comprises displaying the first interactive display in a first window while concurrently displaying the second content segment in a second window by displaying the second window as a pop-up window that overlays the first window.

18. The system of claim 15, wherein the plurality of selectable options further includes a second selectable option to purchase merchandise related to the first content segment.

19. The system of claim 15, wherein the interactive display module is further adapted to determine the user-designated transition based on at least one of a user selection and a user profile.

20. The system of claim 15, wherein the interactive display module is further adapted to determine the user-designated transition by retrieving a default user-designated transition.

21. A computer program product comprising a non-transitory computer-readable storage medium, including operational instructions executable by a processor to:
receive a media content stream, the media content stream including a first content segment and a second content segment, the second content segment received after the first content segment;
display a first interactive display, the first interactive display including a plurality of selectable options for performing an action related to the first content segment, wherein the plurality of selectable options includes at least a first selectable option to make a purchase related to the first content segment;
display a second interactive display before displaying the second content segment when a subscriber is interacting with the first interactive display; and
perform a user-designated transition with respect to the second content segment based on a user input received via the second interactive display.

22. The computer program product of claim 21, wherein the first interactive display is displayed in response to determining a time to display the first interactive display, and wherein determining the time to display the first interactive display comprises identifying a portion of a characteristic of the first content segment.

23. The computer program product of claim 21, wherein the operational instructions to perform the user-designated transition comprise operational instructions to send a request to a media content server while displaying the first interactive display, the request causing the media content server to pause transmission of the media content stream.

* * * * *